United States Patent
Chen et al.

(12)

(10) Patent No.: US 11,970,755 B1
(45) Date of Patent: Apr. 30, 2024

(54) APPLICATION OF CUPROUS SULFIDE IN RECOVERY OF Au (III) FROM AQUEOUS SOLUTIONS

(71) Applicant: Kunming University of Science and Technology, Kunming (CN)

(72) Inventors: Yunlong Chen, Kunming (CN); Jin Wu, Kunming (CN); Futing Zi, Kunming (CN); Xianzhi Hu, Kunming (CN); Fengru Meng, Kunming (CN); Yongmao Zeng, Kunming (CN); Zhongying Wang, Kunming (CN); Yihuai Yang, Kunming (CN)

(73) Assignee: Kunming University of Science and Technology, Kunming (CN)

( * ) Notice: Subject to any disclaimer, the term of this patent is extended or adjusted under 35 U.S.C. 154(b) by 0 days.

(21) Appl. No.: 18/487,992

(22) Filed: Oct. 16, 2023

(30) Foreign Application Priority Data

Oct. 25, 2022  (CN) .......................... 202211307212.5

(51) Int. Cl.
| | | |
|---|---|---|
| *C22B 11/00* | (2006.01) | |
| *B01D 15/08* | (2006.01) | |
| *B01J 20/02* | (2006.01) | |
| *B01J 20/30* | (2006.01) | |
| *C22B 3/20* | (2006.01) | |

(52) U.S. Cl.
CPC .............. *C22B 11/04* (2013.01); *B01D 15/08* (2013.01); *B01J 20/0266* (2013.01); *B01J 20/3085* (2013.01); *C22B 3/20* (2013.01)

(58) Field of Classification Search
None
See application file for complete search history.

(56) References Cited

U.S. PATENT DOCUMENTS 3,317,312 A * 5/1967 Kraus et al. .............. C22B 3/24
210/688
2009/0241735 A1 10/2009 Abe et al.

FOREIGN PATENT DOCUMENTS

| CN | 105463204 A | 4/2016 |
| CN | 110004302 A | 7/2019 |
| CN | 113249580 A | 8/2021 |

OTHER PUBLICATIONS

Search report of CN202211307212.5.
Notification to Grant Patent Right.
First office action of Chinese application : CN202211307212.5.

* cited by examiner

*Primary Examiner* — Colin W. Slifka

(57) ABSTRACT

The present disclosure discloses an application of cuprous sulfide in a recovery of Au (III) from aqueous solutions, which relates to the fields of hydrometallurgy and precious metal recovery. The method of the present disclosure uses cuprous sulfide nanoparticles to recover Au (III) from aqueous solution, and undergoes gold adsorption under mechanical stirring. The method described in the present disclosure can efficiently recover Au (III) from aqueous solutions, has good recovery effects on Au (III) from acidic waste liquid, and has the advantages of energy conservation, environmental protection, and low cost.

1 Claim, No Drawings

APPLICATION OF CUPROUS SULFIDE IN RECOVERY OF Au (III) FROM AQUEOUS SOLUTIONS

TECHNICAL FIELD

The present disclosure relates to the fields of hydrometallurgy and precious metal recovery, in particular to an application of cuprous sulfide in a recovery of Au (III) from aqueous solutions.

BACKGROUND

Gold is a precious metal that has excellent conductivity, thermal conductivity, and corrosion resistance, making it widely used in fields such as aerospace, medical treatment, catalysis, and electronic components, and plays a crucial role in economic development and technological progress. However, the gold industry is currently facing difficulties, such as: (1) although gold production has been increasing year by year, production is far below consumption and production costs are high; (2) The supply gap is large and the grade of gold ore is becoming increasingly poor, most of which is the ore difficult to treat; (3) A considerable portion of gold is distributed in secondary resources such as printed circuit boards, waste catalysts, and electroplating residues, resulting in a waste of gold resources.

For the recovery of gold from secondary resources, mixed acid leaching has significant advantages: (1) Low valent halogens such as Cl⁻ and Br⁻ can form stable complexes with gold, and the leaching rate is faster, the leaching conditions are easier to control, the solution components are simpler, and the volatile acids used as leaching agents can be recycled; (2) Secondary gold resources have the characteristics of high gold grade and small volume, and can be leached in containers with excellent acid resistance, such as that made of fluorine-containing materials. However, the leaching solution contains gold ($AuX_4^-$) and other coexisting metal ions, which require effective and selective separation and enrichment of gold. Relatively speaking, the adsorption method has obvious advantages: (1) The adsorbent has a certain size and hardness, and the residual solution is easy to separate. So, by finding a suitable desorption method, the adsorbent can be recycled while recovering gold, achieving cost savings and reducing resource waste.

At present, various new adsorption materials have been reported for the enrichment and separation of Au (III) in secondary gold resource leaching solutions such as waste circuit boards, catalysts, and industrial waste waters. For gold ($AuCl_4^-$ or $AuBr_4^-$) in acidic solutions, activated carbon has been widely reported as an adsorbent, but its loading capacity and adsorption selectivity are limited, resulting in higher recovery costs. It has also been reported that the use of pine bark tannin resin, graphene oxide, 3D printing Scavenger material, Diaion WA21J ion exchange resin, foam plastic, etc. can achieve better gold adsorption effect, so that the amount of gold adsorption can reach more than 50 kg/t. The above new materials can be used for the adsorption and recovery of $AuX_4^-$ in solution, but most of them are organic synthetic materials, which have problems such as relatively high prices, complex preparation processes, and easy pulverization, making it difficult to popularization and application in practical industry.

SUMMARY

The objective of the present disclosure is to provide an application of cuprous sulfide in Au (III) recovery from aqueous solutions, specifically by adding cuprous sulfide to aqueous solutions containing Au (III) for adsorption of gold, which has advantages such as simple, operation and strong craftsmanship.

Preferably, the pH value of the aqueous solutions containing Au (III) in the present disclosure is 1-5. It is found that under weak acidic conditions, cuprous sulfide can stably exist and has better adsorption effect on gold (III).

Preferably, the preparation method of cuprous sulfide in the present disclosure is as follows: mixing and reacting copper salt solution and thiosulfate solution in the concentration ratio of 1:2-1:10 of copper salt to thiosulfate, then performing centrifugation, and then drying to obtain the cuprous sulfide required.

Preferably, the copper salt solution in the present disclosure is a copper sulfate solution or a copper chloride solution, and the concentration of the copper salt solution is 1-15 mmol/L.

Preferably, the concentration of thiosulfate is 2-120 mmol/L.

The present disclosure uses self-made cuprous sulfide nanoparticles as an adsorbent for Au (III). Due to its well thermal stability, bad solubleness in media (such as water, acetone, ammonium sulfide, dilute sulfuric acid, and dilute hydrochloric acid), and which can exist stably under acidic conditions, thus having strong applicability to various gold solutions. Moreover, cuprous sulfide nanoparticles can be easily controlled by suitable stabilizers to enhance their structure and size, enhancing their adsorption performance. Therefore, the present disclosure has the advantage of cost control and are suitable for the recovery and enrichment of acidic waste liquid containing gold.

The advantageous effects of the present disclosure are:
(1) The gold recovery method described in the present disclosure has advantages of simple process, low cost, and high gold recovery rate.
(2) The prepared cuprous sulfide ($Cu_2S$) has a wide pH range suitable for adsorption solution, and cuprous sulfide has good adsorption effect in the range of $1 \leq pH \leq 5$.
(3) The concentration of copper sulfate used is within 15 mmol/L, and the concentration of sodium thiosulfate is within 120 mmol/L. The demand for reagents during preparation process is low, and it has certain industrial application value.

DETAILED DESCRIPTION OF THE EMBODIMENTS

The present disclosure will be further illustrated in detail in conjunction with specific embodiments, but the scope of the present disclosure is not limited to the description.

Embodiment 1

This embodiment uses a certain concentration of copper sulfate solution and sodium thiosulfate solution to prepare cuprous sulfide nanoparticles under mechanical stirring, which are used to adsorb Au (III) in aqueous solutions, including the following steps:
(1) Weigh 0.025 g (1 mmol/L) of granular copper sulfate, add 80 mL of deionized water to dissolve, and set aside.
(2) Weigh 0.05 g (2 mmol/L) of sodium thiosulfate, add 20 mL of deionized water to dissolve, and set aside.
(3) Add the sodium thiosulfate solution in step (2) to the copper sulfate solution in step (1) (with a total volume of 100 mL), and mechanically stir at a speed of 200 rpm for 24 hours; After stirring, the solid particles obtained through centrifugal filtration are dried in a 60° C. oven for 12 hours before being taken out for later use.

(4) Add the cuprous sulfide ($Cu_2S$) dried in step (3) to a solution of chloroauric acid ($HAuCl_4$) with a concentration of 5 mg/L for stirring adsorption; after adsorption for 24 hours with the pH value of 1, samples are taken and the gold concentration is analyzed by atomic absorption spectrometry. The recovery rate reached 100%, and the loading capacity is 33.33 kg/t.

Embodiment 2

(1) Weigh 0.050 g (2 mmol/L) of granular copper sulfate, add 80 mL of deionized water to dissolve, and set aside.
(2) Weigh 0.496 g (20 mmol/L) of sodium thiosulfate, add 20 mL of deionized water to dissolve, and set aside.
(3) Add the sodium thiosulfate solution in step (2) to the copper sulfate solution in step (1) (with a total volume of 100 mL), and mechanically stir at a speed of 200 rpm for 24 hours; After stirring, the solid particles obtained through centrifugal filtration are dried in a 6012 oven for 12 hours before being taken out for later use.
(4) Add the cuprous sulfide ($Cu_2S$) dried in step (3) into a solution of chloroauric acid ($HAuCl_4$) with a concentration of 10 mg/L for stirring adsorption; after adsorption for 24 hours with the pH value of 2, samples are taken and the gold concentration is analyzed by atomic absorption spectrometry. The recovery rate reached 100%, and the loading capacity is 50 kg/t.

Embodiment 3

(1) Weigh 0.125 g (5 mmol/L) of granular copper sulfate, add 80 mL of deionized water to dissolve, and set aside.
(2) Weigh 0.372 g (15 mmol/L) of sodium thiosulfate, add 20 mL of deionized water to dissolve, and set aside.
(3) Add the sodium thiosulfate solution in step (2) to the copper sulfate solution in step (1) (with a total volume of 100 mL), and mechanically stir at a speed of 200 rpm for 24 hours; After stirring, the solid particles obtained through centrifugal filtration are dried in a 60° C. oven for 12 hours before being taken out for later use.
(4) Weigh 0.01 g of the cuprous sulfide ($Cu_2S$) dried in step (3), add them into a solution of chloroauric acid ($HAuCl_4$) with a concentration of 20 mg/L for stirring adsorption; after adsorption for 24 hours with the pH value of 5, samples are taken and the gold concentration is analyzed by atomic absorption spectrometry. The recovery rate reached 100%, and the loading capacity is 200 kg/t.

Embodiment 4

(1) Weigh 0.136 g (8 mmol/L) of granular copper chloride, add 80 mL of deionized water to dissolve, and set aside.
(2) Weigh 0.620 g (25 mmol/L) of sodium thiosulfate, add 20 mL of deionized water to dissolve, and set aside.
(3) Add the sodium thiosulfate solution in step (2) to the copper chloride solution in step (1) (with a total volume of 100 mL), and mechanically stir at a speed of 200 rpm for 24 hours; After stirring, the solid particles obtained through centrifugal filtration are dried in a 60° C. oven for 12 hours before being taken out for later use.
(4) Weigh 0.01 g of the cuprous sulfide ($Cu_2S$) dried in step (3), add them into a solution of chloroauric acid ($HAuCl_4$) with a concentration of 50 mg/L for stirring adsorption; after adsorption for 24 hours with the pH value of 4, samples are taken and the gold concentration is analyzed by atomic absorption spectrometry. The recovery rate reached 100%, and the loading capacity is 500 kg/t.

Embodiment 5

(1) Weigh 0.250 g (10 mmol/L) of granular copper sulfate, add 80 mL of deionized water to dissolve, and set aside.
(2) Weigh 1.000 g (40 mmol/L) of sodium thiosulfate, add 20 mL of deionized water to dissolve, and set aside.
(3) Add the sodium thiosulfate solution in step (2) to the copper sulfate solution in step (1) (with a total volume of 100 mL), and mechanically stir at a speed of 200 rpm for 24 hours; After stirring, the solid particles obtained through centrifugal filtration are dried in a 60° C. oven for 12 hours before being taken out for later use.
(4) Weigh 0.01 g of the cuprous sulfide ($Cu_2S$) dried in step (3), add them into a solution of chloroauric acid ($HAuCl_4$) with a concentration of 100 mg/L for stirring adsorption; after adsorption for 24 hours with the pH value of 3, samples are taken and the gold concentration is analyzed by atomic absorption spectrometry. The recovery rate reached 100%, and the loading capacity is 1000 kg/t.

Embodiment 6

(1) Weigh 0.375 g (15 mmol/L) of granular copper sulfate, add 80 mL of deionized water to dissolve, and set aside.
(2) Weigh 2.98 g (120 mmol/L) of sodium thiosulfate, add 20 mL of deionized water to dissolve, and set aside.
(3) Add the sodium thiosulfate solution in step (2) to the copper sulfate solution in step (1) (with a total volume of 100 mL), and mechanically stir at a speed of 200 rpm for 24 hours; After stirring, the solid particles obtained through centrifugal filtration are dried in a 60° C. oven for 12 hours before being taken out for later use.
(4) Weigh 0.01 g of the cuprous sulfide ($Cu_2S$) dried in step (3), add them into a solution of chloroauric acid ($HAuCl_4$) with a concentration of 200 mg/L for stirring adsorption; after adsorption for 24 hours with the pH value of 4, samples are taken and the gold concentration is analyzed by atomic absorption spectrometry. The recovery rate reached 100%, and the loading capacity is 2000 kg/t.

Embodiment 7

Study on the adsorption performance of commercially available cuprous sulfide for Au (III)
(1) Weigh 0.01 g of commercially available cuprous sulfide (CIO) (purchased from RHAWN reagent with a purity of 99%).
(2) Add the cuprous sulfide in step (1) to a solution of chloroauric acid ($HAuCl_4$) with a concentration of 200 mg/L for stirring adsorption; after adsorption for 24 hours with the pH value of 4, samples are taken and the gold concentration is analyzed by atomic absorption spectrometry. The recovery rate reached 78%, and the loading capacity is 1560 kg/t.

Embodiment 8

(1) Add 0.170 g (10 mmol/L) of granular copper chloride to 30 mL of EDA (ethylenediamine), dissolve under magnetic stirring, and set aside.

(2) Weigh 0.23 g (0.03 mol/L) of thiourea, add it to the mixed solution in step (1), and continue stirring for 2 hours.

(3) Pour the mixed solution in step (2) into a 50 mL polytetrafluoroethylene reactor and maintain the temperature at 60° C. for 8 hours; after cooling, wash the solid particles 5-8 times with distilled water and ethanol, and dry them in a 60° C. oven for 10 hours to obtain cuprous sulfide.

(4) Weigh 0.01 g of the cuprous sulfide ($Cu_2S$) dried in step (3), add them into a solution of chloroauric acid ($HAuCl_4$) with a concentration of 200 mg/L for stirring adsorption; after adsorption for 24 hours with the pH value of 4, samples are taken and the gold concentration is analyzed by atomic absorption spectrometry. The recovery rate reached 80%, and the loading capacity is 1600 kg/t.

Embodiment 9

(1) Add 0.170 g (10 mmol/L) of granular copper chloride to 30 mL of EDA (ethylenediamine), dissolve under magnetic stirring, and set aside.

(2) Weigh 0.23 g (0.03 mol/L) of thiourea, add it to the mixed solution in step (1), and continue stirring for 2 hours.

(3) Pour the mixed solution in step (2) into a 50 mL polytetrafluoroethylene reactor and maintain the temperature at 80° C. for 8 hours; after cooling, wash the solid particles 5-8 times with distilled water and ethanol, and dry them in a 60° C. oven for 10 hours to obtain cuprous sulfide.

(4) Weigh 0.01 g of the cuprous sulfide ($Cu_2S$) dried in step (3), add them into a solution of chloroauric acid ($HAuCl_4$) with a concentration of 200 mg/L for stirring adsorption; after adsorption for 24 hours with the pH value of 4, samples are taken and the gold concentration is analyzed by atomic absorption spectrometry. The recovery rate reached 87%, and the loading capacity is 1740 kg/t.

Embodiment 10

(1) Add 0.170 g (10 mmol/L) of granular copper chloride to 30 mL of EDA (ethylenediamine), dissolve under magnetic stirring, and set aside.

(2) Weigh 0.23 g (0.03 mol/L) of thiourea, add it to the mixed solution in step (1), and continue stirring for 2 hours.

(3) Pour the mixed solution in step (2) into a 50 mL polytetrafluoroethylene reactor and maintain the temperature at 100° C. for 8 hours; after cooling, wash the solid particles 5-8 times with distilled water and ethanol, and dry them in a 60° C. oven for 10 hours to obtain cuprous sulfide.

(4) Weigh 0.01 g of the cuprous sulfide ($Cu_2S$) dried in step (3), add them into a solution of chloroauric acid ($HAuCl_4$) with a concentration of 200 mg/L for stirring adsorption; after adsorption for 24 hours with the pH value of 4, samples are taken and the gold concentration is analyzed by atomic absorption spectrometry. The recovery rate reached 84%, and the loading capacity is 1680 kg/t.

The specific embodiments of the present disclosure have been described in detail above, but the present disclosure is not limited to the above embodiments. Within the scope of knowledge possessed by ordinary skilled person in the art, various changes can be made without departing from the principle of the present disclosure.

What is claimed is:

1. The application of cuprous sulfide in a recovery of Au (III) from aqueous solutions, comprising: adding cuprous sulfide to aqueous solutions containing Au (III) to adsorb gold, wherein a pH value of the aqueous solutions containing Au (III) is 1-5;

a preparation method of cuprous sulfide is as follows: mixing and reacting copper salt solution and thiosulfate solution in a concentration ratio of 1:2-1:10 of copper salt to thiosulfate, then performing centrifugation, and then drying to obtain the cuprous sulfide required, wherein the copper salt solution is a copper sulfate solution or a copper chloride solution, a concentration of the copper salt solution is 1-15 mmol/L, and a concentration of thiosulfate is 2-120 mmol/L.

* * * * *